US012593282B2

(12) United States Patent
Liu et al.

(10) Patent No.: US 12,593,282 B2
(45) Date of Patent: Mar. 31, 2026

(54) DATA SENDING METHOD AND FOR SAVING POWER CONSUMPTION AND DATA RECEIVING METHOD FOR SAVING POWER CONSUMPTION

(71) Applicant: ZTE Corporation, Shenzhen (CN)

(72) Inventors: Kun Liu, Shenzhen (CN); Bo Dai, Shenzhen (CN); Zhaohua Lu, Shenzhen (CN); Weiwei Yang, Shenzhen (CN); Huiying Fang, Shenzhen (CN); Luanjian Bian, Shenzhen (CN); Youjun Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 766 days.

(21) Appl. No.: 17/631,532

(22) PCT Filed: Jul. 28, 2020

(86) PCT No.: PCT/CN2020/105107
§ 371 (c)(1),
(2) Date: Jan. 31, 2022

(87) PCT Pub. No.: WO2021/018124
PCT Pub. Date: Feb. 4, 2021

(65) Prior Publication Data
US 2022/0286970 A1 Sep. 8, 2022

(30) Foreign Application Priority Data

Jul. 31, 2019 (CN) .......................... 201910703647.3

(51) Int. Cl.
*H04W 52/02* (2009.01)
*H04W 72/0446* (2023.01)
(Continued)

(52) U.S. Cl.
CPC ... *H04W 52/0274* (2013.01); *H04W 72/0446* (2013.01); *H04W 72/23* (2023.01);
(Continued)

(58) Field of Classification Search
CPC ......... H04W 52/0274; H04W 72/0446; H04W 72/23; H04W 74/0833; H04W 76/20;
(Continued)

(56) References Cited

U.S. PATENT DOCUMENTS

2014/0192798 A1* 7/2014 Yang ................. H04W 56/0055
370/350
2018/0132282 A1* 5/2018 Ly ......................... H04W 48/12
(Continued)

FOREIGN PATENT DOCUMENTS

CN 107645779 A 1/2018
CN 108418661 A 8/2018
(Continued)

OTHER PUBLICATIONS

Chinese Office Action for corresponding application 201910703647.3 Report dated Jun. 24, 2022.
(Continued)

*Primary Examiner* — Michael Y Mapa
(74) *Attorney, Agent, or Firm* — CANTOR COLBURN LLP

(57) ABSTRACT

Provided are a data sending method and apparatus, a data receiving method and apparatus, a first node, and a second node. The data sending method includes that in the case of the inactive state or in the case where the radio resource control state is the idle state, data is sent to a second node through a first uplink channel; and that downlink control channels in a first search space are detected.

18 Claims, 2 Drawing Sheets

In the case of the inactive state or in the case where the radio resource control state is the idle state, send data to a second node through a first uplink channel
S110

Detect a downlink control channel in a first search space
S120

(51) Int. Cl.

| | | |
|---|---|---|
| *H04W 72/23* | (2023.01) |
| *H04W 74/0833* | (2024.01) |
| *H04W 76/20* | (2018.01) |
| *H04W 76/30* | (2018.01) |

(52) U.S. Cl.
CPC ........... *H04W 76/20* (2018.02); *H04W 76/30* (2018.02); *H04W 74/0833* (2013.01)

(58) Field of Classification Search
CPC . H04W 76/30; H04W 52/0251; H04W 76/27; H04W 52/0212; H04W 52/0216; H04W 52/0225; H04W 52/0248; H04L 1/1671; H04L 1/1896; H04L 5/0053; H04L 5/0055
USPC ................................ 370/318; 455/450–452.2
See application file for complete search history.

(56) References Cited

U.S. PATENT DOCUMENTS

| | | | | |
|---|---|---|---|---|
| 2019/0082412 A1* | 3/2019 | Zander | .................. | H04W 24/10 |
| 2020/0260397 A1* | 8/2020 | Vos | ......................... | H04L 5/003 |
| 2021/0014864 A1* | 1/2021 | Phuyal | ................. | H04W 72/53 |
| 2021/0298108 A1* | 9/2021 | Wu | .................... | H04W 74/0833 |
| 2021/0352617 A1* | 11/2021 | Choe | ................. | H04W 74/0841 |
| 2022/0014920 A1* | 1/2022 | Pham Van | .............. | H04W 4/20 |
| 2022/0021485 A1* | 1/2022 | Singh | .................... | H04L 1/1819 |
| 2022/0159739 A1* | 5/2022 | Takeda | .............. | H04W 74/0866 |
| 2022/0167385 A1* | 5/2022 | Takeda | ................. | H04L 1/1671 |
| 2022/0225390 A1* | 7/2022 | Harada | ................ | H04L 1/1685 |

FOREIGN PATENT DOCUMENTS

| | | | |
|---|---|---|---|
| CN | 109587769 A | 4/2019 |
| CN | 110536385 A | 12/2019 |
| CN | 110536471 A | 12/2019 |
| WO | 2020198904 A1 | 10/2020 |

OTHER PUBLICATIONS

Chinese Search Report for corresponding application 201910703647.3 Report dated Jun. 16, 2022.

International Search Report for corresponding application PCT/CN2020/105107 filed Jul. 28, 2020; Mail date Oct. 21, 2020.

ZTE Corporation, "Remaining issues for UL aspects of D-PUR in IDLE", 3GPP TSG-RAN2 meeting#106 Reno, Nevada, USA, May 13-17, 2019, R2-1905642.

ZTE Corporation, "Main issues for transmission over preconfigured dedicated resource in IDLE", 3GPP TSG-RAN2 meeting#104, Spokane, United States, Nov. 12-16, 2018, R2-1816993.

European Search Report for corresponding application EP 20 84 6362; Report dated Jul. 5, 2023.

Huawei, HiSilicon, Feature lead summary of Support for transmission in preconfigured UL resources, 3GPP TSG RAN WG1 Meeting #96, Athens Greece, Mar. 1, 2019, R1-1903254.

Sequans Communications, "Consideration for preconfigured uplink resources (PUR)", 3GPP TSG RAN WG1 Meeting #97, Reno, United States May 11-16, 2019, R1-1907080.

ZTE, "Support for transmission in preconfigured UL resources for MB-IoT, " 3GPP TSG RAN WG1 Meeting #96, Athens Greece, Feb. 25-Mar. 1, 2019, R1-1901866.

* cited by examiner

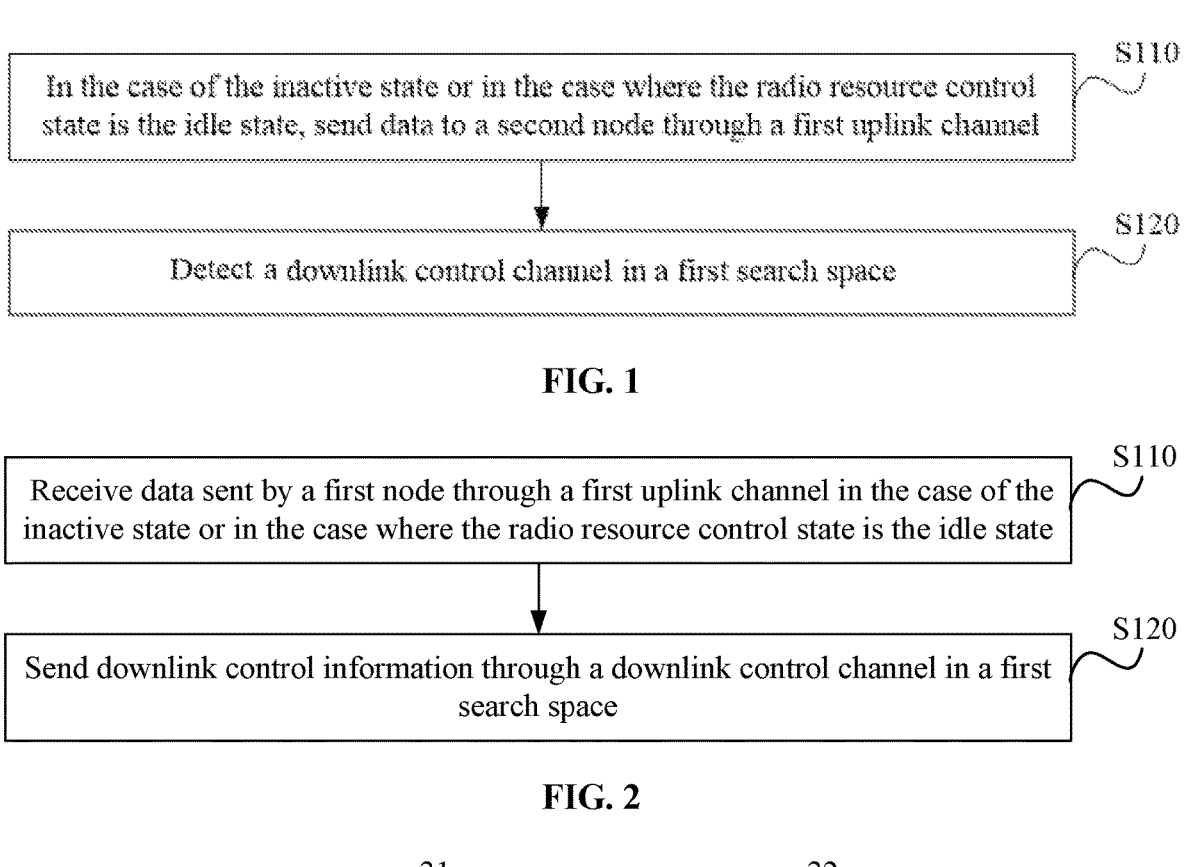

In the case of the inactive state or in the case where the radio resource control state is the idle state, send data to a second node through a first uplink channel
S110

Detect a downlink control channel in a first search space
S120

FIG. 1

Receive data sent by a first node through a first uplink channel in the case of the inactive state or in the case where the radio resource control state is the idle state
S110

Send downlink control information through a downlink control channel in a first search space
S120

Data sending module

Detection module

Receiving module

Sending module

FIG. 4

DATA SENDING METHOD AND FOR SAVING POWER CONSUMPTION AND DATA RECEIVING METHOD FOR SAVING POWER CONSUMPTION

CROSS-REFERENCE TO RELATED APPLICATIONS

This is a National Stage Application filed under 35 U.S.C. 371 based on International Patent Application No. PCT/CN2020/105107, filed on Jul. 28, 2020, which claims priority to Chinese Patent Application No. 201910703647.3 filed on Jul. 31, 2019, disclosures of both of which are incorporated herein by reference in their entireties.

TECHNICAL FIELD

The present application relates to the field of communications, for example, a data sending method and apparatus, a data receiving method and apparatus, a first node, and a second node.

BACKGROUND

With the development of smart terminals and the enrichment of radio data application services, the number of data users in radio communication networks increases substantially. The radio data content is no longer limited to traditional text or images. Multimedia service content, including high-definition videos and mobile televisions, emerges increasingly, leading to an explosive growth of radio communication network traffic. The mobile Internet and the Internet of Things will become the main driving force for mobile communication development.

For the Internet of Things and the communication standard protocols of the Internet of Things, a first node (for example, a terminal) enters the radio resource control (RRC) idle state (RRL_IDLE for short) when no data needs to be sent or received, thus saving the power consumption of the terminal. Before sending or receiving data, the terminal needs to enter the RRC connected state (RRC-CONNECT for short) from the RRC idle state and then perform data sending or receiving. However, the power consumption and system resources of the terminal are consumed when the terminal enters the RRC connected state from the RRC idle state.

SUMMARY

The present application provides a data sending method and apparatus, a data receiving method and apparatus, a first node, and a second node so that the power consumption of the first node is saved.

Embodiments of the present application provide a data sending method. The method includes the following.

In the case of the inactive state or in the case where the radio resource control state is the idle state, data is sent to a second node through a first uplink channel.

A downlink control channel in a first search space is detected.

Embodiments of the present application further provide a data receiving method. The method includes the following.

Data sent by a first node through a first uplink channel in the case of the inactive state or in the case where the radio resource control state is the idle state is received.

Downlink control information is sent through a downlink control channel in a first search space.

Embodiments of the present application provide an uplink channel resource application method. The method includes the following.

A first node applies for an uplink channel resource from a second node. The uplink channel resource is configured to send data in the case of the inactive state or in the case where the radio resource control state is the idle state. The first node satisfies an application condition. The application condition includes at least one of the following:

The timing advance of the first node is in the valid state;

The change of reference signal receiving power within at least one time window does not exceed a threshold value;

The number of cell handovers within at least one time window does not exceed a threshold value; or The movement velocity of the first node meets the requirements.

Embodiments of the present application provide a data sending apparatus. The apparatus includes a data sending module and a detection module.

The data sending module is configured to send data to a second node through a first uplink channel in the case of the inactive state or in the case where the radio resource control state is the idle state.

The detection module is configured to detect a downlink control channel in a first search space.

Embodiments of the present application further provide a data receiving apparatus. The apparatus includes a receiving module and a sending module.

The receiving module is configured to receive data sent by a first node through a first uplink channel in the case of the inactive state or in the case where the radio resource control state is the idle state.

The sending module is configured to send downlink control information through a downlink control channel in a first search space.

Embodiments of the present application provide a first node. The first node includes one or more processors and a storage apparatus configured to store one or more programs.

When executed by the one or more processors, the one or more programs cause the one or more processors to perform the data sending method according to embodiments of the present application.

Embodiments of the present application provide a second node. The second node includes one or more processors and a storage apparatus configured to store one or more programs.

When executed by the one or more processors, the one or more programs cause the one or more processors to perform the data receiving method according to embodiments of the present application.

Embodiments of the present application provide a storage medium for storing a computer program which, when executed by a processor, causes the processor to perform any method in embodiments of the present application.

The preceding embodiments and other aspects of the present application and implementations thereof are described in more detail in the brief description of drawings, detailed description, and claims.

BRIEF DESCRIPTION OF DRAWINGS

FIG. 1 is a flowchart of a data sending method according to the present application.

FIG. 2 is a flowchart of a data receiving method according to the present application.

FIG. 3 is a diagram illustrating the structure of a data sending apparatus according to the present application.

FIG. 4 is a diagram illustrating the structure of a data receiving apparatus according to the present application.

DETAILED DESCRIPTION

Figures 5, 6:
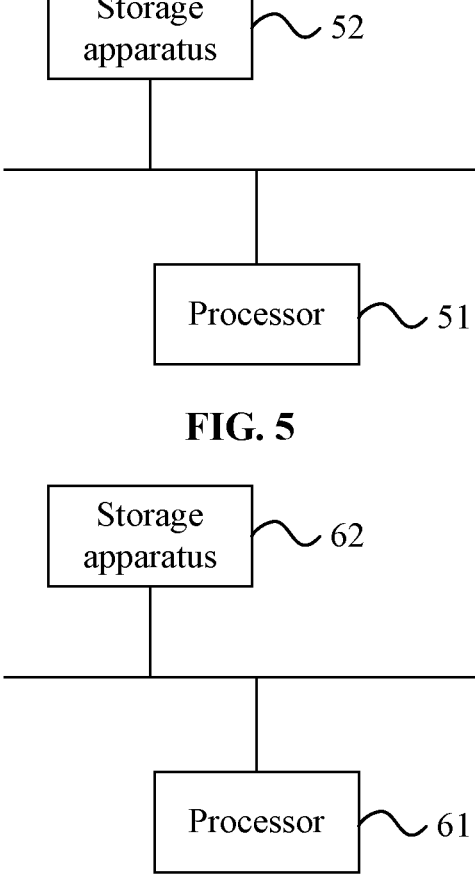
FIG. 5 is a diagram illustrating the structure of a first node according to the present application.
FIG. 6 is a diagram illustrating the structure of a second node according to the present application.

Embodiments of the present application are described hereinafter in detail in conjunction with drawings. It is to be noted that if not in collision, embodiments of the present application and features therein may be combined with each other in any manner.

In an exemplary embodiment, FIG. 1 is a flowchart of a data sending method according to the present application. This method may be suitable for the case where a first node sends data to a second node in the case of the inactive state or in the case where the radio resource control state is the idle state. This method may be performed by a data sending apparatus provided in the present application. The data sending apparatus may be implemented by software and/or hardware and integrated into the first node, for example, a terminal.

For the Internet of Things, the third Generation Partnership Project (3GPP) standard organization has developed two representative communication standard protocols: the Machine Type Communication (MTC) and the Narrow Band Internet of Things (NB-IoT). For the mobile Internet, the 3GPP standard organization has recently developed the 5th generation new radio (5G NR) communication standard protocols. For the Internet of Things and the communication standard protocols of the Internet of Things, the power consumption and system resources of the terminal are consumed when the terminal enters the RRC connected state from the RRC idle state. The data sending method provided in the present application may be considered as a sending method for a channel so that the power consumption of the first node is saved effectively.

As shown in FIG. 1, a data sending method provided in the present application includes S110 and S120.

In S110, in the case of the inactive state or in the case where the radio resource control state is the idle state, data is sent to a second node through a first uplink channel.

A first node sends the data to the second node through the first uplink channel in the case of the inactive state or in the case where the radio resource control state is the idle state. The configuration of a first uplink channel resource includes at least one of the following: the configuration performed by a base station, periodic configuration, or the configuration dedicated to the first node. That is, the first uplink channel resource may be configured by the second node, may be configured periodically, or may be an uplink channel resource dedicated to the first node.

In the present application, in the case of sending the data to the second node, it is unnecessary to enter the RRC idle state from the RRC connected state. The data is sent directly using the first uplink channel in the RRC idle state or in the inactive state.

In S120, a downlink control channel in a first search space is detected.

The first search space is a set of a group of downlink control channels to be detected. The first search space includes the sending position information of at least one downlink control channel. The first uplink channel and the first search space may have a correspondence. After the date is sent through the first uplink channel, the downlink control channel in the first search space and corresponding to the first uplink channel can be detected. The purpose of the detection is not limited. For example, it may include determining whether the data through the first uplink channel is successfully received by the second node or receiving the feedback data that is from the second node based on the data sent through the first uplink channel.

It is to be understood that the first search space may include a group of downlink control channels to be detected. The downlink control channels carry downlink control information (DCI).

According to a data sending method provided in the present application, in the case of the inactive state or in the case where the radio resource control state is the idle state, data is sent to a second node through a first uplink channel; and downlink control channels in a first search space are detected. It effectively solves the problem that the power consumption and system resources of a first node are consumed when the first node enters the RRC connected state from the RRC idle state. In this application, the RRC state of the first node does not need to be switched, saving the power consumption of the first node.

On the basis of the preceding embodiment, variant embodiments of the preceding embodiment are proposed. It is to be noted here that for ease of description, only differences from the preceding embodiment are described in the variant embodiments.

In one example, the method further includes that the state of the data is determined based on whether the downlink control information is detected in the downlink control channels in the first search space.

Before a timer of the first search space expires, the state of the data is determined based on whether the downlink control information is detected in the downlink control channels in the first search space. The state of the data includes but is not limited to successful data transmission and unsuccessful data transmission.

In one example, that the state of the data is determined based on whether the downlink control information is detected in the downlink control channels in the first search space includes that in the case where the downlink control information is detected in the downlink control channels in the first search space, it is determined that the state of the data is successful data transmission. The downlink control information includes an uplink grant or a downlink grant.

In the case where the downlink control information is detected, it is determined that the data is successfully transmitted. What the uplink grant indicates may be an uplink channel resource used for uplink transmission. What the downlink grant indicates may be a downlink channel resource used for downlink transmission.

In one example, that the state of the data is determined based on whether the downlink control information is detected in the downlink control channels in the first search space includes that in the case where the timer of the first search space expires and no downlink control information is detected in the downlink control channels in the first search space, it is determined that the state of the data is unsuccessful data transmission.

In one example, in the case where the data sent through the first uplink channel is the retransmission data in a Hybrid Automatic Repeat reQuest mechanism, the method further includes that in the case where a determination condition is satisfied and no downlink control information is detected in the downlink control channels in the first search space, it is determined that the data sent through the first uplink channel is successfully received by the second node. The determination condition includes at least one of the following: The timer of the first search space expires, or the detection of the downlink control channels in the first search space is completed.

In the case where the timer of the first search space expires and/or the first node completes the detection of the downlink control channels in the first search space, if the first node does not detect the downlink control information sent to the first node, the first node determines that the data sent through the uplink channel is successfully received by the second node. The data sent through the uplink channel is the retransmission data in the Hybrid Automatic Repeat reQuest (HARQ) mechanism.

In the RRC idle state or in the inactive state, the first node sends the data to the second node through the first uplink channel; in this case, the data may be defined as first data. When the first data is not successfully received by the second node, the second node passes the uplink grant (UL grant) carried in a downlink control channel in the first search space. The UL grant includes the uplink channel resource information occupied during the retransmission of a Hybrid Automatic Repeat reQuest (HARQ) of the first data. After receiving the UL grant, the first node sends the HARQ retransmission data of the first data through the corresponding uplink channel resource.

In one example, the downlink control information carried through a downlink control channel in the first search space includes first information. The first information includes at least one of the following: the indication information of first node silencing, the indication information of gap insertion, the indication information of first search space extension, or the indication information of a second search space.

The indication information of first node silencing is the indication information of terminal silencing. The indication information of terminal silencing includes at least one of the following: the information of the starting position of terminal silencing or the information of the time domain length of terminal silencing. The indication information of gap insertion includes at least one of the following: the information of the starting information of a gap or the information of the time domain length of a gap. The indication information of first search space extension includes the information of the time domain length of first search space extension.

In one example, the terminal determines a first time domain length based on the information of the time domain length of a gap in the indication information of gap insertion. Further, the terminal determines the length of the gap based on the first time domain length and the information of the count of repeated sending through a channel. The channel includes at least one of the following: a downlink control channel in the first search space or the first uplink channel. In an embodiment, the length of the gap is that the first time domain length is multiplied by the count of repeated sending through the channel. That is, the length of the gap=the first time domain length*the count of repeated sending through the channel.

In one example, the terminal determines a second time domain length based on the information of the time domain length of a gap in the indication information of gap insertion. Further, the terminal determines the length of the gap based on the second time domain length and a factor G. In an embodiment, the length of the gap is that the second time domain length is multiplied by the factor. That is, the length of the gap=the second time domain length*G, where the value of G is configured by default or by the base station.

It is to be understood that the terminal takes the same processing means towards the time domain length information included in the first information (for example, the information of the time domain length of a gap, the information of the time domain length of first search space extension, the information of the time domain length of terminal silencing, and the information of the time domain length of the second search space). For the detailed processing means, refer to the preceding processing means towards the information of the time domain length of a gap and it is not limited here.

In one example, the terminal determines a third time domain length based on the information of the time domain length of terminal silencing in the indication information of terminal silencing. Further, the terminal determines the length of terminal silencing based on the third time domain length and the information of the count of repeated sending through a channel. The channel includes at least one of the following: a downlink control channel in the first search space or the first uplink channel. In an embodiment, the length of the terminal silence is that the third time domain length is multiplied by the count of repeated sending through the channel.

In one example, the terminal determines a fourth time domain length based on the information of the time domain length of terminal silencing in the indication information of terminal silencing. Further, the terminal determines the length of terminal silencing based on the fourth time domain length and a factor G. In an embodiment, the length of terminal silencing is that the fourth time domain length is multiplied by the factor, where the value of G is configured by default or by the base station.

In one example, the terminal determines a fifth time domain length based on the information of the time domain length of first search space extension in the indication information of first search space extension. Further, the terminal determines the length of first search space extension based on the fifth time domain length and the information of the count of repeated sending through a channel. The channel includes at least one of the following: a downlink control channel in the first search space or the first uplink channel. In an embodiment, the length of first search space extension is that the fifth time domain length is multiplied by the count of repeated sending through the channel.

In one example, the terminal determines a sixth time domain length based on the information of the time domain length of first search space extension in the indication information of first search space extension. Further, the terminal determines the length of first search space extension based on the sixth time domain length and a factor G. In an embodiment, the length of first search space extension is that the sixth time domain length is multiplied by the factor, where the value of G is configured by default or by the base station.

In one example, the terminal determines a seventh time domain length based on the information of the time domain length of the second search space in the indication information of the second search space. Further, the terminal determines the length of the second search space based on the seventh time domain length and the information of the count of repeated sending through a channel. The channel includes at least one of the following: a downlink control channel in the first search space or the first uplink channel. In an embodiment, the length of the second search space is that the seventh time domain length is multiplied by the count of repeated sending through the channel.

In one example, the terminal determines an eighth time domain length based on the information of the time domain length of the second search space in the indication information of the second search space. Further, the terminal determines the length of the second search space based on the eighth time domain length and a factor G. In an embodiment, the length of the second search space is that the eighth time domain length is multiplied by the factor, where the value of G is configured by default or by the base station.

In one example, in the case where the first information includes the indication information of the second search space, the indication information of the second search space includes at least one of the following: the information of the starting position of the second search space or the information of the time domain length of the second search space.

In one example, in the case where the indication information of the second search space includes the information of the starting position of the second search space, the information of the starting position of the second search space includes at least one of the following: a gap between the starting position of the second search space and the first search space or a gap between the starting position of the second search space and the time domain position of a downlink control channel where the downlink control information is located.

The gap between the starting position of the second search space and the first search space includes a gap between the starting position of the second search space and the ending position of the first search space. The gap between the starting position of the second search space and the time domain position of a downlink control channel where the downlink control information is located includes a gap between the starting position of the second search space and the ending position of the downlink control channel.

In one example, the relationship between the second search space and the first search space includes at least one of the following: The second search space is a subset of the first search space, or the second search space and the first search space are configured separately.

In one example, in the case where the downlink control information carried in a downlink control channel in the first search space includes the indication information that the data sent through the first uplink channel is successfully received by the second node, the downlink control information includes the first information.

It is to be understood that the prerequisite for the downlink control information including the first information is that the downlink control information includes the indication information that "the data sent through the uplink channel is correctly received by the base station".

In one example, the method further includes that in the case of falling back to a random access procedure, in the random access procedure, an uplink message is sent to the second node. The uplink message carries second information. The second information includes at least one of the following: the first indication information or the second indication information. The second indication information is the indication information of a situation other than a situation indicated by the first indication information.

The first indication information includes at least one of the following: the indication information that timing advance is invalid; the indication information that the data is unsuccessfully sent through the first uplink channel; the indication information that target data needs to be transmitted, where the target data is data other than the data sent through the first uplink channel; the indication information that the change of reference signal receiving power exceeds a threshold value; the indication information that the timer of timing advance expires; or the indication information that no downlink control channel sent by the second node is detected in the downlink control channels in the first search space.

The second information may be a triggering condition or cause for the first node falling back to the random access procedure.

The indication information that the change of reference signal receiving power (RSRP) exceeds a threshold value may include at least one of the following: the indication information that "the change of reference signal receiving power (RSRP) exceeds a threshold value, triggering the fallback to the random access procedure", the indication information that "the change of reference signal receiving power (RSRP) is excessively great", the indication information that "the change of reference signal receiving power (RSRP) is excessively great, triggering the fallback to the random access procedure", or the indication information that "the change of reference signal receiving power (RSRP) results in the fallback to the random access procedure".

The second indication information may be the indication information of another situation. For example, the second information may include the following three indication information: the indication information that "the timer of timing advance (TA) expires", the indication information that "the change of reference signal receiving power exceeds a threshold value", and the indication information of another situation. When the triggering condition or cause for the first node falling back to the random access procedure is not that "the timer of timing advance (TA) expires" or that "the change of reference signal receiving power (RSRP) exceeds a threshold value", the second information is the indication information of another situation.

In one example, the uplink message includes message 3 in the random access procedure and message 5 in the random access procedure.

In one example, in the case where the second information includes the indication information that the change of reference signal receiving power exceeds a threshold value, the reconfiguration information of the first uplink channel is received, where the reconfiguration information is sent by the second node through message 4 in the random access procedure. The reconfiguration information of the first uplink channel is carried in a radio resource control message in message 4. The radio resource control message includes one of the following: a radio resource control connection release message, a radio resource control early data complete message, or a radio resource control message configured for the first uplink channel.

In one example, in the case where the second information includes the indication information that the timer of timing advance expires, a radio resource control message sent by the second node through message 4 in the random access procedure is received. In the case where the radio resource control message is received, further in the case of the inactive state or in the case where the radio resource control state is the idle state, the data is sent to the second node through the first uplink channel. The radio resource control message includes one of the following: a radio resource control connection release message, a radio resource control early data complete message, or a radio resource control message configured for the first uplink channel.

In one example, the method further includes that in the case where message 4 in the random access procedure sent by the second node is received, third information is sent through a second uplink channel. The third information includes the acknowledgement information that message 4 in the random access procedure is successfully received.

In one example, in the case where the third information is sent through the second uplink channel, one of the following operations is performed: entering the radio resource control idle state; continuing to detect the downlink control channels and, in the case where a downlink control channel detection timer expires, entering the radio resource control idle state; continuing to detect the downlink control channels and, in the case where no downlink control information is detected, entering the radio resource control idle state; or continuing to detect the downlink control channels and, in the case where the downlink control channel detection timer expires and no downlink control information is detected, entering the radio resource control idle state.

In one example, message 4 in the random access procedure carries at least one of the following: downlink data or a determined RRC message.

The determined RRC message includes a radio resource control early data complete message. The radio resource control early data complete message is the reply information of early data transmission (EDT). EDT refers to an uplink data carried in message 3 (Msg3) by the first node.

The data sending method is exemplarily described hereinafter. In the RRC idle state or in the inactive state, a first node, that is, a terminal, sends data to a second node, that is, a base station, through a first uplink channel. The data includes at least one of the following: uplink service data information, control information, or higher-layer information.

A resource of the first uplink channel is configured by the base station. The resource of the first uplink channel is configured periodically and/or the resource of the first uplink channel is dedicated to the terminal. A resource of the first uplink channel may be determined as a "preconfigured uplink resource (PUR)". An uplink transmission using a resource of the first uplink channel is referred to as a PUR transmission.

The base station configures a first search space of downlink control channels for the terminal. The first search space includes at least one candidate set of the downlink control channels. A candidate set of a corresponding downlink control channel is configured in each PUR transmission.

After a PUR transmission, the terminal detects the candidate set of the downlink control channels corresponding to the base station. When a downlink control channel is detected by the terminal and the downlink control information included in the downlink control channel includes the indication information that "the data sent through the uplink channel is successfully received by the base station", the terminal detects downlink control channels in a second search space.

The configuration information of the second search space is sent in the downlink control information sent through a downlink control channel in the first search space. The configuration information of the second search space includes at least one of the following: the information of the starting position of the second search space or the information of the time domain length of the second search space. The starting position of the second search space may be a gap relative to the ending position of the first search space.

In the case of a timer expires, the terminal stops detecting the downlink control channels in the second search space and enters the RRC idle state.

Except for this embodiment, in the case where the terminal completes the detection of the downlink control channels in the second search space but does not detect the downlink control information, sent to the second terminal, in the downlink control channels in the second search space, the terminal enters the RRC idle state.

Another exemplary description is performed hereinafter for this embodiment. In the RRC idle state or in the inactive state, a terminal sends data to a base station through a first uplink channel. The data includes uplink service data information and/or higher-layer information.

A resource of the first uplink channel is configured by the base station. The resource of the first uplink channel is configured periodically and/or the resource of the first uplink channel is dedicated to the terminal. The resource of the uplink channel may be determined as a "preconfigured uplink resource (PUR)". An uplink transmission using the resource of the uplink channel is referred to as a PUR transmission.

The base station configures a search space of downlink control channels for the terminal. The search space includes at least one candidate set of the downlink control channels. A candidate set of a corresponding downlink control channel is configured in each PUR transmission.

After completing a PUR transmission, the terminal detects the candidate set of the downlink control channels corresponding to the search space. When a condition of performing fallback to a random access procedure is satisfied, the terminal performs an operation of the random access procedure. The random access procedure includes at least the transmission of four messages, Msg 1, Msg 2, Msg 3, and Msg 4.

In the random access procedure, the terminal carries indication information in Msg 3. The indication information includes at least one of the following: the indication information that "the change of reference signal receiving power (RSRP) exceeds a threshold value", the indication information that "the timer of timing advance (TA) expires", or the indication information that "in the search space, the terminal does not detect the downlink control channel sent by the base station".

In the case where the indication information includes the indication information that "the change of reference signal receiving power (RSRP) exceeds a threshold value", the terminal receives the reconfiguration information of a PUR, where the reconfiguration information is sent by the base station through Msg4.

The reconfiguration information of the PUR is carried in an RRC message of Msg4. The RRC message includes one of the following: an RRC Connection Release message, an RRC Connection Release message, or an RRC message configured for the PUR transmission.

In the case where the indication information includes the indication information that "the timer of timing advance (TA) expires", the terminal receives an RRC message sent by the base station through Msg4. After receiving the RRC message, the terminal continues to send the data to the base station through a PUR in the RRC idle state or in the inactive state. The RRC message includes one of the following: an RRC Connection Release message, an RRC Connection Release message, or an RRC message configured for the PUR transmission.

In one exemplary embodiment, the present application further provides a data receiving method. FIG. 2 is a flowchart of a data receiving method according to the present application. This method may be suitable for the case where a first node sends data to a second node in the case of the inactive state or in the case where the radio resource control state is the idle state. This method may be performed by a data receiving apparatus provided in the present application. The data receiving apparatus may be implemented by software and/or hardware and integrated into the second node, for example, a base station. For the content that is not yet exhaustive in this embodiment, reference may be made to the above embodiments, which is not repeated here.

As shown in FIG. 2, the data receiving method provided in the present application includes S210 and S220.

In S210, data sent by a first node through a first uplink channel in the case of the inactive state or in the case where the radio resource control state is the idle state is received.

In S220, downlink control information is sent through a downlink control channel in a first search space.

The downlink control information may be used by the first node to determine whether the data sent through the first uplink channel is successfully received. The downlink control information may also include the feedback information that is from the second node based on the data sent through the first uplink channel.

According to a data receiving method provided in the present application, data sent by a first node through a first uplink channel in the case of the inactive state or in the case where the radio resource control state is the idle state is received; and downlink control information is sent through a downlink control channel in a first search space. It effectively solves the problem that the power consumption and system resources of a first node are consumed when the first node enters the RRC connected state from the RRC idle state. In this application, the RRC state of the first node does not need to be switched, saving the power consumption of the first node.

On the basis of the preceding embodiment, variant embodiments of the preceding embodiment are proposed. It is to be noted here that for ease of description, only differences from the preceding embodiment are described in the variant embodiments.

In one example, the downlink control information includes first information. The first information includes at least one of the following: the indication information of first node silencing, the indication information of gap insertion, the indication information of first search space extension, or the indication information of a second search space.

In one example, in the case where the first information includes the indication information of the second search space, the indication information of the second search space includes at least one of the following: the information of the starting position of the second search space or the information of the time domain length of the second search space.

In one example, in the case where the indication information of the second search space includes the information of the starting position of the second search space, the information of the starting position of the second search space includes at least one of the following: a gap between the starting position of the second search space and the first search space or a gap between the starting position of the second search space and the time domain position of a downlink control channel where the downlink control information is located.

In one example, the relationship between the second search space and the first search space includes at least one of the following: The second search space is a subset of the first search space, or the second search space and the first search space are configured separately.

In one example, in the case where the downlink control information carried in a downlink control channel in the first search space includes the indication information that the data sent through the first uplink channel is successfully received, the downlink control information includes the first information.

The present application provides a data sending apparatus. FIG. 3 is a diagram illustrating the structure of a data sending apparatus according to the present application. As shown in FIG. 3, the data sending apparatus in embodiments of the present application may be integrated into a first node. The apparatus includes a data sending module 31 and a detection module 32. The data sending module 31 is configured to send data to a second node through a first uplink channel in the case of the inactive state or in the case where the radio resource control state is the idle state. The detection module 32 is configured to detect downlink control channels in a first search space.

The data sending apparatus provided in this embodiment is configured to perform the data sending method provided in the present application. The data sending apparatus provided in this embodiment has similar implementation principles and technical effects to the data sending method provided in the present application, which is not be repeated here.

In one example, the apparatus further includes a first determination module configured to determine the state of the data based on whether the downlink control information is detected in the downlink control channels in the first search space.

In one example, the apparatus further includes a first determination module specifically configured to, in the case where the downlink control information is detected in the downlink control channels in the first search space, determine that the state of the data is successful data transmission. The downlink control information includes an uplink grant or a downlink grant.

In one example, the apparatus further includes a first determination module specifically configured to, in the case where a timer of the first search space expires and no downlink control information is detected in the downlink control channels in the first search space, determine that the state of the data is unsuccessful data transmission.

In one example, the apparatus further includes a second determination module configured to, in the case where the data sent through the first uplink channel is the retransmission data in a Hybrid Automatic Repeat reQuest mechanism, in the case where a determination condition is satisfied and no downlink control information is detected in the downlink control channels in the first search space, determine that the data sent through the first uplink channel is successfully received by the second node. The determination condition includes at least one of the following: The timer of the first search space expires, or the detection of the downlink control channels in the first search space is completed.

In one example, in the detection module 32, the downlink control information carried through a downlink control channel in the first search space includes first information. The first information includes at least one of the following: the indication information of first node silencing, the indication information of gap insertion, the indication information of first search space extension, or the indication information of a second search space.

In one example, for the detection module 32, in the case where the first information includes the indication information of the second search space, the indication information of the second search space includes at least one of the following: the information of the starting position of the second search space or the information of the time domain length of the second search space.

<br/>

In one example, for the detection module 32, in the case where the indication information of the second search space includes the information of the starting position of the second search space, the information of the starting position of the second search space includes at least one of the following: a gap between the starting position of the second search space and the first search space or a gap between the starting position of the second search space and the time domain position of a downlink control channel where the downlink control information is located.

In one example, in the detection module 32, the relationship between the second search space and the first search space includes at least one of the following: The second search space is a subset of the first search space, or the second search space and the first search space are configured separately.

In one example, for the detection module 32, in the case where the downlink control information carried in a downlink control channel in the first search space includes the indication information that the data sent through the first uplink channel is successfully received by the second node, the downlink control information includes the first information.

In one example, the apparatus further includes an uplink information sending module configured to, in the case of falling back to a random access procedure, in the random access procedure, an uplink message is sent to the second node. The uplink message carries second information. The second information includes at least one of the following: the first indication information or the second indication information. The second indication information is the indication information of a situation other than a situation indicated by the first indication information. The first indication information includes at least one of the following: the indication information that timing advance is invalid; the indication information that the data is unsuccessfully sent through the first uplink channel; the indication information that target data needs to be transmitted, where the target data is data other than the data sent through the first uplink channel; the indication information that the change of reference signal receiving power exceeds a threshold value; the indication information that the timer of timing advance expires; or the indication information that no downlink control channel sent by the second node is detected in the downlink control channels in the first search space.

In one example, the uplink message in the uplink information sending module includes message 3 in the random access procedure and message 5 in the random access procedure.

In one example, the uplink information sending module is configured to, in the case where the second information includes the indication information that the change of reference signal receiving power exceeds a threshold value, receive the reconfiguration information of the first uplink channel, where the reconfiguration information is sent by the second node through message 4 in the random access procedure. The reconfiguration information of the first uplink channel is carried in a radio resource control message in message 4. The radio resource control message includes one of the following: a radio resource control connection release message, a radio resource control early data complete message, or a radio resource control message configured for the first uplink channel.

In one example, the uplink information sending module is configured to, in the case where the second information includes the indication information that the timer of timing advance expires, receive a radio resource control message sent by the second node through message 4 in the random access procedure and, in the case where the radio resource control message is received, further in the case of the inactive state or in the case where the radio resource control state is the idle state, send the data to the second node through the first uplink channel. The radio resource control message includes one of the following: a radio resource control connection release message, a radio resource control early data complete message, or a radio resource control message configured for the first uplink channel.

In one example, the apparatus further includes a third information sending module configured to, in the case where message 4 in the random access procedure sent by the second node is received, send third information through a second uplink channel. The third information includes the acknowledgement information that message 4 in the random access procedure is successfully received.

In one example, the third information sending module is configured to, in the case where the third information is sent through the second uplink channel, perform one of the following operations: entering the radio resource control idle state; continuing to detect the downlink control channels and, in the case where a downlink control channel detection timer expires, entering the radio resource control idle state; continuing to detect the downlink control channels and, in the case where no downlink control information is detected, entering the radio resource control idle state; or continuing to detect the downlink control channels and, in the case where the downlink control channel detection timer expires and no downlink control information is detected, entering the radio resource control idle state.

In one example, in the third information sending module, message 4 in the random access procedure carries at least one of the following: downlink data or a determined RRC message.

The present application further provides a data receiving apparatus. FIG. 4 is a diagram illustrating the structure of a data receiving apparatus according to the present application. As shown in FIG. 4, the data receiving apparatus provided in embodiments of the present application may be integrated into a second node. The apparatus includes a receiving module 41 and a sending module 42. The receiving module 41 is configured to receive data sent by a first node through a first uplink channel in the case of the inactive state or in the case where the radio resource control state is the idle state. The sending module 42 is configured to send downlink control information through a downlink control channel in a first search space.

The data receiving apparatus provided in this embodiment is configured to perform the data receiving method provided in embodiments of the present application. The data receiving apparatus provided in this embodiment has similar implementation principles and technical effects to the data receiving method provided in embodiments of the present application, which is not be repeated here.

In one example, in the sending module 42, the downlink control information includes first information. The first information includes at least one of the following: the indication information of first node silencing, the indication information of gap insertion, the indication information of first search space extension, or the indication information of a second search space.

In one example, for the sending module 42, in the case where the first information includes the indication information of the second search space, the indication information of the second search space includes at least one of the following: the information of the starting position of the second search space or the information of the time domain length of the second search space.

In one example, for the sending module 42, in the case where the indication information of the second search space includes the information of the starting position of the second search space, the information of the starting position of the second search space includes at least one of the following: a gap between the starting position of the second search space and the first search space or a gap between the starting position of the second search space and the time domain position of a downlink control channel where the downlink control information is located.

In one example, in the sending module 42, the relationship between the second search space and the first search space includes at least one of the following: The second search space is a subset of the first search space, or the second search space and the first search space are configured separately.

In one example, for the sending module 42, in the case where the downlink control information carried in a downlink control channel in the first search space includes the indication information that the data sent through the first uplink channel is successfully received, the downlink control information includes the first information.

Embodiments of the present application provide a first node. FIG. 5 is a diagram illustrating the structure of a first node according to the present application. As shown in FIG. 5, the first node provided in the present application includes one or more processors 51 and a storage apparatus 52. One or more processors 51 may be provided in the first node. In FIG. 5, one processor 51 is taken as an example. The storage apparatus 52 is configured to store one or more programs. When executed by the one or more processors 51, the one or more programs cause the one or more processors 51 to perform the data sending method according to embodiments of the present application.

The one or more processors 51 in the first node and the storage apparatus 52 in the first node device are connected through a bus or in other manners. The connection through a bus is taken as an example in FIG. 5.

As a computer-readable storage medium, the storage apparatus 52 may be configured to store software programs, computer-executable programs, and modules, such as program instructions/modules (for example, the data sending module 31 and the detection module 32 that are in the data sending apparatus) corresponding to the data sending method according to embodiments of the present application. The storage apparatus 52 may include a program storage region and a data storage region. The program storage region may store an operating system and an application program required by at least one function. The data storage region may store data created depending on the use of a device. Additionally, the storage apparatus 52 may include a high-speed random-access memory and may further include a nonvolatile memory, such as at least one disk memory, a flash memory, or another nonvolatile solid-state memory. In some examples, the storage apparatus 52 may further include memories located remotely relative to the one or more processors 51, and these remote memories may be connected to the first node via a network. Examples of the preceding network include, but are not limited to, the Internet, an intranet, a local area network, a mobile communication network, and a combination thereof.

Embodiments of the present application provide a second node. FIG. 6 is a diagram illustrating the structure of a second node according to the present application. As shown in FIG. 6, the second node provided in the present application includes one or more processors 61 and a storage apparatus 62. One or more processors 61 may be provided in the second node. In FIG. 6, one processor 61 is taken as an example. The storage apparatus 62 is configured to store one or more programs. When executed by the one or more processors 61, the one or more programs cause the one or more processors 61 to perform the data receiving method according to embodiments of the present application.

The one or more processors 61 in the second node and the storage apparatus 62 in the first node device are connected through a bus or in other manners. The connection through a bus is taken as an example in FIG. 6.

As a computer-readable storage medium, the storage apparatus 62 may be configured to store software programs, computer-executable programs, and modules, such as program instructions/modules (for example, the data receiving module 41 and the sending module 42 that are in the data receiving apparatus) corresponding to the data receiving method according to embodiments of the present application. The storage apparatus 62 may include a program storage region and a data storage region. The program storage region may store an operating system and an application program required by at least one function. The data storage region may store data created depending on the use of a device. Additionally, the storage apparatus 62 may include a high-speed random-access memory and may further include a nonvolatile memory, such as at least one disk memory, a flash memory, or another nonvolatile solid-state memory. In some examples, the storage apparatus 62 may further include memories located remotely relative to the one or more processors 61, and these remote memories may be connected to the first node via a network. Examples of the preceding network include, but are not limited to, the Internet, an intranet, a local area network, a mobile communication network, and a combination thereof.

Embodiments of the present application further provide a storage medium. The storage medium stores a computer program which, when executed by a processor, causes the processor to perform any data sending method according to embodiments of the present application or any data receiving method according to embodiments of the present application.

The data sending method includes that in the case of the inactive state or in the case where the radio resource control state is the idle state, data is sent to a second node through a first uplink channel; and that downlink control channels in a first search space are detected.

The data receiving method includes that data sent by a first node through a first uplink channel in the case of the inactive state or in the case where the radio resource control state is the idle state is received and that downlink control information is sent through a downlink control channel in a first search space.

The present application provides an uplink channel resource application method. The method includes that a first node applies for an uplink channel resource from a second node. The uplink channel resource is configured to send data in the case of the inactive state or in the case where the radio resource control state is the idle state. The first node satisfies an application condition. The application condition includes at least one of the following: The timing advance of the first node is in the valid state; the change of reference signal receiving power within at least one time window does not exceed a threshold value; the number of cell handovers within at least one time window does not exceed a threshold value; or the movement velocity of the first node meets the requirements.

For the first node (for example, a terminal) applying for an uplink channel resource, the premise is to satisfy an application condition. That is, before applying for an uplink channel resource from a base station (that is, the second node), the terminal needs to satisfy an application condition. The application condition includes at least one of the following: The timing advance of the first node is in the valid state; the change of reference signal receiving power (RSRP) within at least one time window does not exceed a threshold value; the number of cell handovers within at least one time window does not exceed a threshold value; or the movement velocity of the first node meets the requirements. The uplink channel resource is used for the terminal to send data in the RRC idle state or in the inactive state.

That the movement velocity of the first node meets the requirements includes that the movement velocity of the first node is lower than a threshold value. The threshold value is configured by the base station or by default. The configuration of the uplink channel resource includes at least one of the following: the configuration performed by a base station, periodic configuration, or the configuration dedicated to the first node. That is, the uplink channel resource may be configured by the second node, may be configured periodically, or may be dedicated to the first node.

In the uplink channel resource application method provided in the present application, before applying for an uplink channel resource from a base station, a first node needs to satisfy an application condition, effectively guaranteeing the application efficiency of the uplink channel resource In one example, the application condition is configured by the second node.

The application condition may be configured in a system message of the second node.

The present application provides an uplink channel resource application apparatus. The apparatus includes an application module configured such that a first node applies for an uplink channel resource from a second node. The uplink channel resource is configured to send data in the case of the inactive state or in the case where the radio resource control state is the idle state. The first node satisfies an application condition. The application condition includes at least one of the following: The timing advance of the first node is in a valid state; the change of reference signal receiving power within at least one time window does not exceed a threshold value; the number of cell handovers within at least one time window does not exceed a threshold value; or the movement velocity of the first node meets the requirements.

The uplink channel resource application apparatus provided in this embodiment is configured to perform the uplink channel resource application method provided in embodiments of the present application. The uplink channel resource application apparatus provided in this embodiment has similar implementation principles and technical effects to the uplink channel resource application method provided in embodiments of the present application, which is not be repeated here.

In one example, in the application module, the application condition is configured by the second node.

The present application provides a first node. The first node includes one or more processors and a storage apparatus for storing one or more programs. When executed by the one or more processors, the one or more programs cause the one or more processors to perform any uplink channel resource application method according to the present application.

The first node provided in the present application includes one or more processors and a storage apparatus. One or more processors may be provided in the first node. The storage apparatus is configured to store one or more programs. When executed by the one or more processors, the one or more programs cause the one or more processors to perform the uplink channel resource application method according to embodiments of the present application.

The one or more processors in the first node and the storage apparatus in the first node device may be connected through a bus or in other manners. As a computer-readable storage medium, the storage apparatus may be configured to store software programs, computer-executable programs, and modules, such as program instructions/modules (for example, the application module in the uplink channel resource application apparatus) corresponding to the uplink channel resource application method according to embodiments of the present application. The storage apparatus may include a program storage region and a data storage region. The program storage region may store an operating system and an application program required by at least one function. The data storage region may store data created depending on the use of a device. Additionally, the storage apparatus may include a high-speed random-access memory and may further include a nonvolatile memory, such as at least one disk memory, a flash memory, or another nonvolatile solid-state memory. In some examples, the storage apparatus may further include memories located remotely relative to the one or more processors, and these remote memories may be connected to the first node via a network. Examples of the preceding network include, but are not limited to, the Internet, an intranet, a local area network, a mobile communication network, and a combination thereof.

Embodiments of the present application further provide a storage medium. The storage medium stores a computer program which, when executed by a processor, causes the processor to perform the uplink channel resource application method according to embodiments of the present application.

The storage medium stores a computer program which, when executed by a processor, causes the processor to perform any uplink channel resource application method according to embodiments of the present application. The uplink channel resource application method includes that a first node applies for an uplink channel resource from a second node. The uplink channel resource is configured to send data in the case of the inactive state or in the case where the radio resource control state is the idle state. The first node satisfies an application condition. The application condition includes at least one of the following: The timing advance of the first node is in a valid state; the change of reference signal receiving power within at least one time window does not exceed a threshold value; the number of cell handovers within at least one time window does not exceed a threshold value; or the movement velocity of the first node meets the requirements.

Embodiments of the present application further provide a releasing method. The method includes that in the RRC idle state or in the inactive state, a terminal sends data to a base station through an uplink channel; that in the case where the data includes release request information, the terminal detects a downlink control channel through which the base station sends the data in a first search space; and that in the case where the downlink control information in the downlink control channel includes the indication information of a correct transmission in the physical layer (PHY) and/or the indication information of a correct transmission in the radio link control (RLC) layer, the terminal determines that a resource occupied by the uplink channel is released.

The uplink channel may be configured by the base station, may be configured periodically, and may be dedicated to the terminal. The first search space is a set of a group of downlink control channels to be detected. The first search space includes the sending position information of at least one downlink control channel.

The releasing method can guarantee that the terminal effectively releases a resource occupied by uplink information.

Embodiments of the present application further provide a releasing apparatus. The apparatus includes a sending module and a releasing module. The sending module is configured such that in the RRC idle state or in the inactive state, a terminal sends data to a base station through an uplink channel. The releasing module is configured such that in the case where the data includes release request information, the terminal detects a downlink control channel through which the base station sends the data in a first search space and such that in the case where the downlink control information in the downlink control channel includes the indication information of correct transmission in the physical layer (PHY) and/or the indication information of correct transmission in the radio link control (RLC) layer, the terminal determines that a resource occupied by the uplink channel is released.

The releasing apparatus provided in this embodiment is configured to perform the releasing method provided in the present application. The releasing apparatus provided in this embodiment has similar implementation principles and technical effects to the releasing method provided in the present application, which is not be repeated here.

Embodiments of the present application further provide a device. The device includes one or more processors and a storage apparatus for storing one or more programs. When executed by the one or more processors, the one or more programs cause the one or more processors to perform any releasing method according to embodiments of the present application.

The first node provided in the present application includes one or more processors and a storage apparatus. One or more processors may be provided in the first node. The storage apparatus is configured to store one or more programs. When executed by the one or more processors, the one or more programs cause the one or more processors to perform the releasing method according to embodiments of the present application.

The one or more processors in the first node and the storage apparatus in the first node device may be connected through a bus or in other manners. As a computer-readable storage medium, the storage apparatus may be configured to store software programs, computer-executable programs, and modules, such as program instructions/modules (for example, the sending module in the releasing apparatus and the releasing module in the releasing apparatus) corresponding to the releasing method according to embodiments of the present application. The storage apparatus may include a program storage region and a data storage region. The program storage region may store an operating system and an application program required by at least one function. The data storage region may store data created depending on the use of a device. Additionally, the storage apparatus may include a high-speed random-access memory and may further include a nonvolatile memory, such as at least one disk memory, a flash memory, or another nonvolatile solid-state memory. In some examples, the storage apparatus may further include memories located remotely relative to the one or more processors, and these remote memories may be connected to the first node via a network. Examples of the preceding network include, but are not limited to, the Internet, an intranet, a local area network, a mobile communication network, and a combination thereof.

Embodiments of the present application further provide a storage medium. The storage medium stores a computer program which, when executed by a processor, causes the processor to perform the releasing method according to embodiments of the present application.

The storage medium stores a computer program which, when executed by a processor, causes the processor to perform any releasing method according to embodiments of the present application. The releasing method includes that in the RRC idle state or in the inactive state, a terminal sends data to a base station through an uplink channel; that in the case where the data includes release request information, the terminal detects a downlink control channel through which the base station sends the data in the first search space; and that in the case where the downlink control information in the downlink control channel includes the indication information of correct transmission in the physical layer (PHY) and/or the indication information of correct transmission in the radio link control (RLC) layer, the terminal determines that a resource occupied by the uplink channel is released.

The above are only exemplary embodiments of the present application and are not intended to limit the scope of the present application.

It is to be understood by those skilled in the art that the term "terminal" covers any suitable type of radio UE, for example, a mobile phone, a portable data processing device, a portable web browser, or a vehicle-mounted mobile station.

In general, multiple embodiments of the present application may be implemented in hardware, a dedicated circuit, software, logic, or any combination thereof. For example, some aspects may be implemented in hardware while other aspects may be implemented in firmware or software that may be performed by a controller, a microprocessor, or other computing apparatuses, although the present application is not limited thereto.

Embodiments of the present application may be implemented by computer program instructions executed by a data processor of a mobile apparatus, for example, in a processor entity, may be implemented by hardware, or may be implemented by a combination of software and hardware. The computer program instructions may be assembly instructions, instruction set architecture (ISA) instructions, machine instructions, machine-related instructions, micro-codes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps with logic circuits, modules, and functions. Computer programs may be stored in a memory. The memory may be of any type suitable for a local technical environment and may be implemented using any suitable data storage technology, such as, but not limited to, a read-only memory (ROM), a random-access memory (RAM), and an optical memory device and system (digital video disc (DVD) or compact disc (CD)). Computer-readable media may include non-transitory storage media. The data processor may be of any type suitable to the local technical environment, such as, but is not limited to, a general purpose computer, a special purpose computer, a microprocessor, a digital signal processor (DSP), an application specific integrated circuit (ASIC), a field-programmable gate array (FGPA), and a processor based on a multi-core processor architecture.

What is claimed is:

1. A data sending method for saving power consumption, comprising:

in a case of an inactive state or in a case where a radio resource control state is an idle state, sending data to a second node through a first uplink channel; and detecting a downlink control channel in a first search space;

wherein the method further comprises: in a case of falling back to a random access procedure, in the random access procedure, sending an uplink message to the second node, wherein the uplink message carries second information and the second information comprises first indication information, wherein the first indication information comprises:

indication information that a change of reference signal receiving power exceeds a threshold value; and wherein the method further comprises: receiving reconfiguration information of the first uplink channel, wherein the reconfiguration information is sent by the second node through message 4 in the random access procedure, wherein the reconfiguration information of the first uplink channel is carried in a radio resource control message in the message 4, and the radio resource control message comprises one of the following:

a radio resource control connection release message;

a radio resource control early data complete message; or a radio resource control message configured for the first uplink channel.

2. The method according to claim 1, further comprising:

determining a state of the data based on whether downlink control information is detected in the downlink control channel in the first search space.

3. The method according to claim 2, wherein determining the state of the data based on whether the downlink control information is detected in the downlink control channel in the first search space comprises:

in a case where the downlink control information is detected in the downlink control channel in the first search space, determining that the state of the data is successful data transmission, wherein the downlink control information comprises an uplink grant or a downlink grant.

4. The method according to claim 2, wherein determining the state of the data based on whether the downlink control information is detected in the downlink control channel in the first search space comprises:

in a case where a timer of the first search space expires and no downlink control information is detected in the downlink control channel in the first search space, determining that the state of the data is unsuccessful data transmission.

5. The method according to claim 1, in a case where the data sent through the first uplink channel is retransmission data in a Hybrid Automatic Repeat reQuest mechanism, further comprising:

in a case where a determination condition is satisfied and no downlink control information is detected in the downlink control channel in the first search space, determining that the data sent through the first uplink channel is successfully received by the second node, wherein the determination condition comprises at least one of the following:

a timer of the first search space expires; or detection of the downlink control channel in the first search space is completed.

6. The method according to claim 1, wherein downlink control information carried in the downlink control channel in the first search space comprises first information, wherein the first information comprises at least one of the following:

indication information of first node silencing;

indication information of gap insertion;

indication information of first search space extension; or indication information of a second search space.

7. The method according to claim 6, wherein in a case where the first information comprises the indication information of the second search space, the indication information of the second search space comprises at least one of the following:

information of a starting position of the second search space; or information of a time domain length of the second search space;

wherein in a case where the indication information of the second search space comprises the information of the starting position of the second search space, the information of the starting position of the second search space comprises at least one of the following:

a gap between the starting position of the second search space and the first search space; or a gap between the starting position of the second search space and a time domain position of the downlink control channel where the downlink control information is located; or wherein a relationship between the second search space and the first search space comprises at least one of the following:

the second search space is a subset of the first search space; or the second search space and the first search space are configured separately.

8. The method according to claim 6, wherein in a case where the downlink control information carried in the downlink control channel in the first search space comprises indication information that the data sent through the first uplink channel is successfully received by the second node, the downlink control information comprises the first information.

9. The method according to claim 1, wherein the uplink message comprises message 3 in the random access procedure and message 5 in the random access procedure.

10. The method according to claim 1, further comprising:

in a case where the second information further comprises indication information that a timer of timing advance expires, receiving the radio resource control message sent by the second node through the message 4 in the random access procedure; and in a case where the radio resource control message is received, further in the case of the inactive state or in the case where the radio resource control state is the idle state, sending the data to the second node through the first uplink channel.

11. The method according to claim 1, further comprising:

in a case where the message 4 in the random access procedure sent by the second node is received, sending third information through a second uplink channel, wherein the third information comprises acknowledgement information that message 4 in the random access procedure is successfully received.

12. The method according to claim 11, wherein in a case where the third information is sent through the second uplink channel, one of the following operations is performed:

entering the idle state;

continuing to detect the downlink control channel and, in a case where a downlink control channel detection timer expires, entering the idle state;

continuing to detect the downlink control channel and, in a case where no downlink control information is detected, entering the idle state; or continuing to detect the downlink control channel and, in a case where the downlink control channel detection timer expires and no downlink control information is detected, entering the idle state.

13. The method according to claim 11, wherein the message 4 in the random access procedure further comprises at least one of the following:

downlink data; or a determined radio resource control (RRC) message.

14. The method according to claim 1, wherein the first indication information further comprises at least one of the following:

indication information that the data is unsuccessfully sent through the first uplink channel;

indication information that target data needs to be transmitted, wherein the target data is data other than data sent through the first uplink channel;

indication information that a timer of timing advance expires; or indication information that no downlink control channel sent by the second node is detected in the downlink control channel in the first search space.

15. A data receiving method for saving power consumption, comprising:

receiving data sent by a first node through a first uplink channel in a case of an inactive state or in a case where a radio resource control state is an idle state; and sending downlink control information through a downlink control channel in a first search space;

wherein the method further comprises: in a random access process that the first node falls back to, receiving an uplink message from the first node, wherein the uplink message carries second information and the second information comprises first indication information, wherein the first indication information comprises:

indication information that a change of reference signal receiving power exceeds a threshold value; and wherein the method further comprises: sending reconfiguration information of the first uplink channel to the first node through message 4 in the random access procedure, wherein the reconfiguration information of the first uplink channel is carried in a radio resource control message in the message 4, and the radio resource control message comprises one of the following:

a radio resource control connection release message;

a radio resource control early data complete message; or a radio resource control message configured for the first uplink channel.

16. The method according to claim 15, wherein the downlink control information comprises first information, wherein the first information comprises at least one of the following:

indication information of first node silencing;

indication information of gap insertion;

indication information of first search space extension; or indication information of a second search space.

17. The method according to claim 16, wherein in a case where the first information comprises the indication information of the second search space, the indication information of the second search space comprises at least one of the following:

information of a starting position of the second search space; or information of a time domain length of the second search space;

wherein in a case where the indication information of the second search space comprises the information of the starting position of the second search space, the information of the starting position of the second search space comprises at least one of the following:

a gap between the starting position of the second search space and the first search space; or a gap between the starting position of the second search space and a time domain position of the downlink control channel where the downlink control information is located; or wherein a relationship between the second search space and the first search space comprises at least one of the following:

the second search space is a subset of the first search space; or the second search space and the first search space are configured separately.

18. The method according to claim 16, wherein in a case where the downlink control information carried in the downlink control channel in the first search space comprises indication information that the data sent through the first uplink channel is successfully received, the downlink control information comprises the first information.

* * * * *